United States Patent Office 3,071,512
Patented Jan. 1, 1963

3,071,512
NEW HYPOTENSIVE PHARMACEUTICAL PREPARATION CONTAINING α-TOCOPHERYL-QUINONE
Harry Feldmann, Geneva, Switzerland, assignor to Sogespar S.A., Fribourg, Canton of Fribourg, Switzerland, a Swiss firm
No Drawing. Filed Jan. 26, 1959, Ser. No. 788,771
4 Claims. (Cl. 167—65)

The present invention has for its object to provide a new hypotensive pharmaceutical preparation containing α-tocopheryl-quinone which shows marked hypotensive properties when given by mouth at daily doses of 150 to 300 mg. of the active product, i.e. α-tocopheryl-quinone.

Another object of the invention is to provide an improved method for preparing α-tocopheryl-quinone permitting to obtain this product practically pure at a relatively low price, directly from α-tocopherol by oxidation with silver nitrate.

A further object of the invention is to provide a method for producing a pharmaceutical preparation which may be readily given by mouth and containing the oily α-tocopheryl-quinone adsorbed in a mixture of silicium oxide and carob-pips' meal which is thereafter admixed to the usual ingredients of sugar-coated pills.

The best known method for producing α-tocopheryl-quinone is the method of John (Z. Physiol. Chem. 1937/250.11). This method comprises oxidizing α-tocopherol into α-tocopheryl-quinone by means of silver nitrate. Independently of its high cost, in view of the great relative quantity of silver nitrate and alcohol used, this method does not permit, as confirmed by Karrer and Geiger (Helv. Chim. Acta 23, p. 457, 1940) to obtain α-tocopheryl-quinone sufficiently pure for rendering subsequent chromatographic purification unnecessary. The purity of the α-tocopheryl-quinone directly obtained by John's method is actually of 60 to 70% only.

I have found that this low grade of purity is due to following reasons:

(1) The silver nitrate was used in too high amounts, i.e. 3.2 kg. for 1 kg. α-tocopherol so that the α-tocopheryl-quinone was oxidated as soon as it was produced;
(2) The quantity of alcohol used was very important, i.e. 30 liters per kg. α-tocopherol so that the product which was formed was very dispersed and therefore subject to oxidation;
(3) The end of the reaction was very imprecisely controlled, by the occurrence of the red colour; the reaction was therefore nearly always pushed too far, which was another cause of oxidation of the product.

In order to remedy these imperfections and to obtain practically pure α-tocopheryl-quinone at a relatively low price, I have improved John's method by using only 5 parts of alcohol at 95% and 0.5 part of silver nitrate for oxidizing one part of α-tocopherol and proposed to control the reaction, until the reducing power has disappeared, by way of a solution of iron perchloride in presence of potassium ferricyanide.

It is possible thereby to obtain directly an α-tocopheryl-quinone with a high grade of purity, of at least 95%, according to its physical constants. It is therefore possible to obtain under these conditions outstanding yields of a product which may be utilized directly without further purification; this lowers considerably the production cost, independently of the fact that a lesser quantity of alcohol is used and silver nitrate added for oxidation of the α-tocopherol in approximately equimolecular amounts.

A practical example of my improved method is given hereafter:

1 kg. of α-tocopherol is dissolved in 5 kg. of alcohol at 95% in a flask. The flask is heated in a water-bath and the solution continuously stirred until its temperature reaches 50° C.; 0.5 kg. of finely divided silver nitrate is then added. One follows up the reaction while stirring, by measuring the reducing power of the solution, until this power disappears, by way of a solution of iron perchloride in the presence of potassium ferricyanide. When the reducing power of the solution has disappeared, the solution is filtrated, the residue (silver+ silver nitrate) is washed with alcohol, the filtrate being added to the mother solution. One adds thereto about 5 kg. methylene-chloride and the solution is admixed wtih an equivalent amount of water into which the alcohol passes, while the methylene-chloride solution of the α-tocopheryl-quinone forms a separate layer which is carefully washed until the ion $Ag^+$ has disappeared. After the methylene-chloride solution has been freed of the remaining traces of water an amount thereof containing 500 gr. of the oily α-tocopheryl-quinone is admixed to 425 gr. of a mixture of silicium oxide (375 gr.) and carob-pips' meal (50 gr.) and, after the adsorption is completed, the mixture is heated for vaporizing the methylene-chloride adsorbed therein.

Thereafter, the usual components required for obtaining a compressible mass, e.g. lactose (375 gr.), polyvinylpyrrolidone (25 gr.) are admixed. The mass is then passed through a sieve, admixed with talcum (25 gr.) and compressed into tablets weighing 270 mg. and containing 100 mg. of α-tocopheryl-quinone. These tablets are thereafter sugar-coated in the usual way.

The hypotensive properties of this pharmaceutical preparation have been proved by a series of pharmacodynamical and clinical tests which have shown that it is a well tolerated and potent hypotensive drug, with protracted effect which may be taken as a cure without inducing a habit. It seems to lower the blood-pressure by action on the adrenal gland and probably also by eutrophic action onto the vascular walls.

Hypotension occurs generally ten days after the treatment is started and is generally maintained for one to three weeks after the treatment is discontinued.

A series of clinical cases is disclosed hereafter by way of example, in order to prove the effectiveness of the preparation according to the invention:

Case 1

Mr. Q. ——, 68 years. Corpulent.
Essential arterial hypertension: 19–11.
Arterio-sclerosis.
3 pills a day (6×½ pill=6×50 mg. α-tocopheryl-quinone).
Treatment discontinued for 20 days; after 15 days, blood-pressure: 20–12.
After resumption of the treatment, blood-pressure is progressively lower to: 15–9 and maintained after interruption of the administration of the drug.
3 months later: blood-pressure=15–9.

Case 2

Mr. C. ——, 70 years.
Essential hypertension: 19–10.
Tabetic.
1½ pills a day for 10 days: blood-pressure is lowered to: 16–9.
After treatment is discontinued: blood-pressure rises to: 18–10.
After resumption of the treatment with 3 pills a day, blood-pressure is lowered after one week to: 13–5.

The dosage is lowered progressively to 1½ pills and to ½ pill a day.
Blood-pressure remains at: 13–8.

Case 3

Mr. G. ——, 83 years.
Hypertension: 19–12. Arterio-sclerosis.
Coronaritis. Diabetes.
3 pills a day.
The 8th day: blood pressure=14–9.
12 days after interruption of the treatment blood-pressure remains at: 15–9.

What I claim is:
1. A method for preparing a hypotensive pharmaceutical preparation consisting in oxidizing one part α-tocopherol, in solution in 5 parts alcohol at 95% with 0.5 part silver nitrate, the reaction being controlled, until the reducing power disappears, by means of a solution of iron perchloride in presence of potassium ferricyanide, adding successively methylene-chloride and water thereto and separating the layer formed by the methylene-chloride solution of the α-tocopheryl-quinone from the water and alcohol layer, adsorbing the methylene-chloride solution in a mixture of carob-flour and silicium oxide, subjecting the mixture to heating for vaporizing the methylene-chloride adsorbed therein.

2. A method of producing hypotension in a living host which comprises administering α-tocopheryl-quinone to said living host.

3. A method of producing hypotension in a living host which comprises administering α-tocopheryl-quinone and a carrier to said living host.

4. A method of producing hypotension in a living host which comprises administering α-tocopheryl-quinone in a mixture of carob-flour and silicium oxide to said living host.

References Cited in the file of this patent
UNITED STATES PATENTS

| | | |
|---|---|---|
| 2,608,561 | Monnberg et al. | Aug. 26, 1952 |
| 2,685,553 | Carrol et al. | Aug. 3, 1954 |
| 2,856,414 | Robeson et al. | Oct. 14, 1958 |
| 2,862,851 | Reichstein et al. | Dec. 2, 1958 |
| 2,888,382 | Pleyte et al. | May 26, 1959 |
| 2,895,881 | Hamada | July 21, 1959 |

OTHER REFERENCES

Vitamins and Hormones, Academic Press Inc., New York, 1955, vol. XIII, p. 233.
Jour. Am. Vet. Med. Assoc., Oct. 15, 1956, p. 370.